(12) United States Patent
Bate

(10) Patent No.: US 6,921,787 B2
(45) Date of Patent: Jul. 26, 2005

(54) NON-STICK COATING AND METHOD OF FORMING SAME

(75) Inventor: Thomas J. Bate, Glenview, IL (US)

(73) Assignee: Akzo Nobel Non-Stick Coatings, Des Plaines, IL (US)

(*) Notice: Subject to any disclaimer, the term of this patent is extended or adjusted under 35 U.S.C. 154(b) by 0 days.

(21) Appl. No.: 10/727,791

(22) Filed: Dec. 3, 2003

(65) Prior Publication Data

US 2004/0167263 A1 Aug. 26, 2004

Related U.S. Application Data

(60) Provisional application No. 60/430,455, filed on Dec. 3, 2002, and provisional application No. 60/470,227, filed on May 13, 2003.

(51) Int. Cl.$^7$ .................................................. C08L 1/00
(52) U.S. Cl. ..................... 524/386; 524/379; 524/502; 524/544; 428/323; 428/422; 428/325; 442/59; 526/89
(58) Field of Search ................................ 524/386, 379, 524/502, 544; 526/89; 428/323, 422, 325, 442; 442/59

(56) References Cited

U.S. PATENT DOCUMENTS

| 5,240,775 | A | * | 8/1993 | Tannenbaum | 428/422 |
| 5,721,053 | A | * | 2/1998 | Thomas | 428/422 |
| 5,985,454 | A | * | 11/1999 | McMordie et al. | 428/413 |
| 6,242,058 | B1 | * | 6/2001 | Bahadur et al. | 427/515 |
| 6,403,213 | B1 | * | 6/2002 | Huesmann | 428/325 |
| 2003/0144400 | A1 | * | 7/2003 | Osen et al. | 524/432 |

OTHER PUBLICATIONS

International Search Report dated Jun. 7, 2004 for PCT/US03/38212.

* cited by examiner

*Primary Examiner*—David W. Wu
*Assistant Examiner*—Henry S. Hu
(74) *Attorney, Agent, or Firm*—Brinks Hofer Gilson & Lione

(57) ABSTRACT

Non-stick coatings for use on a flexible substrate include a fluoropolymer, an acrylic polymer, and a polyol and/or diol. The ratio of acrylic polymer to polyol and/or diol is between about 90:10 and about 10:90 by weight, preferably about 50:50. The ratio of acrylic polymer and polyol or diol to fluoropolymer is preferably about 100:60 by weight.

6 Claims, No Drawings

NON-STICK COATING AND METHOD OF FORMING SAME

This application claims priority to Provisional Application Nos. 60/430,455 filed Dec. 3, 2002 and 60/470,227 filed May 13, 2003.

BACKGROUND OF THE INVENTION

It is sometimes desirable to coat a flexible surface with a non-stick coating. Traditional coatings that are used on rigid surfaces (e.g. cookware) are unacceptable because they are unable to bend and flex along with the flexible surface. A specific application in which this problem has arisen concerns pressure rollers for printing machines.

Modern printing machines generally contain a heated fuser roller and an opposing pressure roller. As paper is fed between the rollers, the heated fuser roller melts (i.e., fuses) toner onto the paper to form the desired image. The pressure roller applies sufficient pressure to the paper to allow it to touch the fuser roller and have the image applied to it. The pressure roller typically consists of a steel or aluminum core that is coated with some type of rubber. The rubber on the pressure roller is flexible so that it can bend and adapt to the topographical features of the fuser roller and paper. The higher the quality of the image desired, and the faster the printing rate of the printer or copier, the softer the rubber on the pressure roller must be so that the ink does not smudge when it melts. The rubber in modern high quality, high speed printers is commonly a very low durometer silicone rubber. In some copiers, a single roller is capable of acting as the fuser roller, the pressure roller, or both. In addition, some printers apply silicone oil to the roller in order to aid the release of toner.

It is desirable to apply a non-stick coating to the pressure rollers to protect the soft rubber from chemical and thermal degradations, as well as to prevent the paper and ink from sticking to the roller. Applying a non-stick coating to such soft rubber, however, presents a number of problems. First, it is difficult for conventional non-stick coatings to stick to this very soft silicone rubber because the non-stick coating must be able to bend and flex with the silicone rubber that it coats. If the non-stick coating is not sufficiently flexible, it will crack and/or peel away from the pressure roller during use. This decreases the print quality of the resultant image. Second, conventional fluoropolymer coatings are relatively hard when compared to the soft silicone rubbers used on pressure rollers. As a result, the non-stick coatings increase the effective durometer of the pressure roller and decrease the conformability of the roller. This is counterproductive to the goal of a very soft pressure roller that produces a high quality image. Lastly, in those situations where silicone oil is used, the silicone oil can attack the silicone rubber and cause it to swell. Swelling of the silicone rubber is undesirable because it compromises the quality of the image and the life of the roller.

Prior attempts at a non-stick coating for a pressure roller include the application of a fluoropolymer sleeve over the roller surface. Problems with prior art fluoropolymer sleeves, however, include an unacceptable increase in the effective durometer of the pressure roller and a high rate of delaminating due to shear stresses between the fluoropolymer sleeve and the rubber roller. When a sleeve wears out (i.e., delaminates), it peels away from the pressure roller and becomes wrinkled. The wrinkled pressure roller creates very poor quality images and must be replaced at great expense. For this reason, there is a need for non-stick coating that can be used on a flexible surface, yet is durable, functional, and low-cost.

BRIEF SUMMARY

A non-stick coating formulation is provided. The coating formulation comprises an acrylic polymer, a polyol or a diol, and a fluoropolymer. The ratio of acrylic polymer to polyol is between about 90:10 and about 10:90 by weight.

DETAILED DESCRIPTION

The non-stick coating of the present invention may be used to coat a substrate of any desired hardness. The type of substrate to which the coating is applied does not limit the scope of the invention. The coating of the present invention may be used on rigid surfaces (e.g., cookware), though it is preferably used to coat a flexible surface. A "flexible surface" is any surface that deforms, bends, flexes, or changes shape when subjected to an external force or pressure. In one embodiment, the non-stick coating of the present invention is used to coat a soft rubber pressure roller for use in a printing machine, such as a high-speed digital copier or printer. Non-limiting examples of the soft rubbers that may be coated with the non-stick coating of the present invention are silicone rubber, EPDM rubber (ethylene propylene diene rubber), and neoprene.

The non-stick coatings of the present invention may be applied to a substrate in a one-coat process or a multi-coat process. An example of a multi-coat process is a two-coat process consisting of a primer coat and a top coat. The two-coat process results in a coating that is more durable and has better release properties than the one-coat process, however, it may be more expensive.

The non-stick coatings of the present invention contain an acrylic polymer and a diol or a polyol, or mixtures thereof. The ratio of acrylic polymer to diol or polyol is preferably between 90:10 and 10:90 by weight. Generally, the greater the ratio of acrylic polymer to diol or polyol, the stronger but less flexible the resultant coating will be. The preferred ratio of acrylic polymer to diol or polyol therefore depends on the durometer of the substrate being coated and the desired strength of the coating. For example, a ratio of acrylic polymer to diol or polyol of 15:85 or lower is appropriate for a substrate having a durometer less than 10. (Unless otherwise stated, all references to durometer are based on the Shore A scale). For a substrate having a durometer greater than 10, a 50:50 or greater ratio may be used.

Useful acrylic polymers include polymers and copolymers of esters of acrylic acid and methacrylic acid, such as methyl acrylate, methyl methacrylate, ethyl acrylate, ethyl methacrylate, propyl acrylate, propyl methacrylate, butyl acrylate, butyl methacrylate, and similar monomers. The preferred acrylic polymer is hydroxy-functional. Preferred acrylic polymers are commercially available as an emulsion from S.C. Johnson & Son under the tradename JONCRYL 1540 or as a colloidal dispersion from Noveon Inc. under the tradename CARBOSET 514H. One or more different acrylic polymers may be combined for use in the coating formulations of the present invention. For example, a blend of JONCRYL 1540 and CARBOSET 514H may be used. Such blends are useful to optimize particular characteristics of the coating, such as gloss and chemical resistance.

The coatings of the present invention include a diol, a polyol, or mixtures thereof. As used herein, a diol is any alcohol that contains two hydroxyl groups per molecule and a polyol is any alcohol that contains three or more hydroxyl groups per molecule. Useful diols include urethanes, polyesters, acrylics or hybrid acrylic urethanes. A preferred diol is a polyester diol commercially available from King Industries under the trade name K-FLEX XM 7304. Useful polyols include urethanes, polyesters, acrylics or hybrid acrylic urethanes. A preferred polyol is a polyurethane polyol commercially available from King Industries under the trade name K-FLEX XM 6304.

Preferably, a melamine is used to cross-link the acrylic polymer with the diol or polyol. A preferred melamine is a methylated melamine formaldehyde resin and is commercially available from Cytec Industries under the tradenames CYMEL 325 or CYMEL 303. Another preferred methylated melamine, hexamethoxymethyl melamine, is commercially available from UCB Inc. under the tradename RESIMENE 745. Desirably, the cross-linking is catalyzed with a blocked acid catalyst. A preferred catalyst is a strong acid catalyst, para-toluene sulfonic acid (P-TSA), commercially available from King Industries under the tradename K-CURE 1040W.

The non-stick coating of the present invention also includes a fluoropolymer. The fluoropolymer is responsible for the non-stick quality of the coating. There are myriad commercially available fluoropolymers and the specific fluoropolymer chosen does not limit the scope of the present invention. The fluoropolymer component of the present invention may include a single type of fluoropolymer, or may include a mixture or blend of more than one type of fluoropolymer. The ratio of acrylic polymer and polyol or diol to fluoropolymer (i.e., (acrylic polymer+polyol/diol):fluoropolymer) is preferably about 100:60 in the formulation for a one-coat system and between about 90:10 and about 70:30 for a formulation intended to be applied as an intermediate coat. Depending on the particular application, it is desirable for the ratio of acrylic polymer and polyol or diol to fluoropolymer in the top coat to be between about 70:30 and about 30:70. A roller that is to be used in a copier that does not use silicone oil preferably includes a top coat having a ratio of acrylic polymer and polyol or diol to fluoropolymer of about 30:70.

Exemplary fluoropolymers are tetrafluoroethylene-perfluoromethyl vinyl ether copolymer (MFA), tetrafluoroethylene-hexafluoropropylene copolymer (FEP), and polytetrafluoroethylene (PTFE). FEP is a preferred fluoropolymer. The preferred FEP is commercially available as a water-based latex dispersion commercially available from Dyneon LLC and sold under the trade name DYNEON FEP X 6300. PTFE is another preferred fluoropolymer. The preferred PTFE is commercially available as a micropowder from Asahi Chemical and sold under the trade name WIT-CON TL-10.

Non-limiting examples of other acceptable fluoropolymers are polychloro-trifluoroethylene (PCTFE), ethylene-chlorotrifluoroethylene copolymer (ECTFE), ethylene-tetrafluoroethylene copolymer (ETFE), tetrafluoroethylene (TFE) and perfluoro (ethyl vinyl ether) (PEVE) copolymer (PFA), TFE and perfluoro (propyl vinyl ether) (PPVE) copolymer (PFA), polyvinylfluoride (PVF), and polyvinylidene fluoride (PVDF). The fluoropolymer component may also include comonomer modifiers that improve selected characteristics.

The fluoropolymer may be a micropowder. Alternatively, the fluoropolymer may be provided in the form of a dispersion of fluoropolymer in water. By "dispersion" it is meant that the fluoropolymer particles are stably dispersed in water so that the particles do not settle before the dispersion is used. In some cases it may be desirable to include an organic solvent, such as n-methylpyrrolidone, butyrolactone, high boiling aromatic solvents, alcohols, or mixtures thereof.

The coating system of the present invention may include a silane. The silane may be included as an ingredient in a formulation for a one-coat system or applied as the first coat in a multi-coat system. Preferred silanes include vinyltrimethoxysilane, gamma-methacycloxypropyltrimethoxy silane, vinyltris (t-butylperoxy) silane and partially hydrolyzed silanes. The preferred silane for use in a one coat formulation is commercially available from Dowcon under the tradename Z-6020. The silane preferably comprises between 1.0 and 2.5% by weight of the total non-stick coating formulation. For a multi-coat system, the preferred silane is commercially available from Shin-Etsu Chemical Co. under the tradename X33-156-5. Alternatively, a one-coat formulation containing a silane may be applied as the primer (or other layer) in a multi-coat system.

The coating system of the present invention may include an additive to aid release. The preferred release additive is a polyether modified dimethylpolysiloxane copolymer in a butylglycol solvent that is commercially available from BYK-Chemie GmbH under the tradename BYK-301.

The coating system of the present invention may include a dispersant. The preferred dispersant is an acetylene diol dispersant that is commercially available from Air Products and Chemicals, Inc. under the tradenames SURFYNOL CT 324 or SURFYNOL 104BC.

Following is a specific example of a one-coat formulation. The composition comprises 29.9% acrylic emulsion (43% in water), 2.7% PTFE micropowder, 8.3% propylene glycol, 2.7% alkyl phenol polyethelyeneoxide, 13.2% polyester diol (30% emulsion in water), 0.3% blocked acid catalyst, 0.9% silane, 0.5% acetylene diol dispersant, and 9.3% methylated melamine formaldehyde resin. The balance of the formulation is water and additives. Each additive comprises less than 2% of the composition. The additives include well known defoamers, flow agents, dispersants, surfactants, stabilizers, thickeners and/or fillers.

The one-coat formulation is filtered through a mesh filter rated at 53 microns and sprayed onto the substrate by conventional or high volume, low pressure (HVLP) methods. The thickness of the dry coat is from about 20 to about 30 microns.

The coating is cured for about ten minutes in a conventional oven operating at approximate 450° F. The silicone rubber that is commonly used to coat pressure rollers begins to thermally decompose at about 500–550° F. Thus, it is desirable to cure the coating in such a manner that the temperature of the silicone rubber stays below 500° F.

As noted above, the non-stick coating of the present invention can be applied in a two-coat process. The first coat is a primer that helps bond a subsequent layer which contains a fluoropolymer to the substrate. Any primer that effectively bonds to the chosen substrate is acceptable. Where the substrate consists of silicone rubber or other rubber having a hydroxy functional group (such as EPDM rubber), the primer is preferably a silane primer as described above. The primer component may consist of a single type of primer; alternatively, different primers may be mixed or combined to form the primer. The primer is preferably applied as a very thin layer having a thickness of between one molecule to a few microns. The primer may be applied by wiping it on the substrate with a cloth or by conventional or HVLP spray guns. The applied primer is typically very volatile and may be dried by any desirable means, though it is preferably dried in a conventional oven at 150° F. for about 3–5 minutes or at air temperature (~77° F.) for about fifteen minutes.

A first embodiment of a top coat composition comprises 23.0% acrylic polymer emulsion (43% in water), 13.1% PTFE micropowder, 6.5% propylene glycol, 2.1% alkyl phenol polyethelyeneoxide, 10.2% polyurethane diol (30% emulsion in water), 1% silane, 0.5% acetylene diol dispersant, and 0.3% blocked acid catalyst. The balance of the formulation is water and additives. Each additive comprises less than 2% of the composition. The additives include well known defoamers, flow agents, dispersants, surfactants, stabilizers, thickeners and/or fillers. This composition has a ratio of acrylic polymer to diol of about 85:15 and a ratio of acrylic polymer and polyol to fluoropolymer of about 70:30.

A second embodiment of a top coat composition comprises approximately 7% acrylic polymer emulsion, 22% polyurethane polyol, 7.1% methylated melamine formaldehyde resin, 17.8% FEP dispersion, 0.3% blocked acid catalyst, 6.7% propylene glycol, and 5% of a polyether modified dimethylpolysiloxane copolymer release agent. The balance of the formulation is water and additives. Each additive comprises less than 2% of the composition. The additives include well known defoamers, flow agents, dispersants, surfactants, stabilizers, thickeners and/or fillers. This composition has a ratio of acrylic to polyol of about 85:15 and a ratio of acrylic polymer and polyol to fluoropolymer of about 70:30. This embodiment of a top coat is particularly useful where the coated roller may come in contact with silicone oil.

The preferred thickness of the top coat varies according to the hardness of the substrate. If the durometer of the substrate is less than 10, the thickness of the top coat is preferably less than 5 microns. If the durometer of the substrate is between 10 and 20, the thickness of the top coat is preferably less than 7 microns. If the durometer of the substrate is greater than 20, the thickness of the top coat is preferably greater than 10 microns, most preferably about 20–30 microns. The top coat is sprayed directly on top of the dried primer and the article is cured in a conventional oven at about 400° F. for about 10 minutes. If the coating is to be used in a copier that uses silicone oil, it is desirable to cure the coating at a lower temperature, e.g., about 350° F. The lower temperature is preferred in order to avoid the formation of a completely melted, continuous network of fluoropolymer. A discontinuous network of fluoropolymer is preferred because it creates interstices that absorb silicone oil and aid efficient operation of the copier.

In another embodiment, the non-stick coating of the present invention can be applied in a three-step process. The first coat is a primer that helps bond a subsequent layer which contains a fluoropolymer to the substrate. Any primer that effectively bonds to the chosen substrate is acceptable. Where the substrate consists of silicone rubber or other rubber having a hydroxy functional group (such as EPDM rubber), the primer is preferably a silane primer as described above. The primer component may consist of a single type of primer; alternatively, different primers may be mixed or combined to form the primer. The primer is preferably applied as a very thin layer having a thickness of between one molecule to a few microns. The primer may be applied by wiping it on the substrate with a cloth or by conventional or HVLP spray guns. The applied primer is typically very volatile and may be dried by any desirable means, though it is preferably dried in a conventional oven at 150° F. for about 3–5 minutes or at air temperature (~77° F.) for about fifteen minutes.

The first embodiment of a top coat described above with respect to the two-coat process is an acceptable mid-coat for the three-coat process. Another embodiment of a mid-coat composition comprises approximately 7% acrylic polymer emulsion, 22% polyurethane polyol, 7.1% methylated melamine formaldehyde resin, 17.8% FEP dispersion, 0.5% acetylene diol dispersant, 0.3% blocked acid catalyst, and 6.7% propylene glycol. The balance of the formulation is water and additives. Each additive comprises less than 2% of the composition. The additives include well known defoamers, flow agents, dispersants, surfactants, stabilizers, thickeners and/or fillers. This composition has a ratio of acrylic to polyol of about 85:15 and a ratio of acrylic and polyol to fluoropolymer of about 70:30.

A preferred top coat for the three-coat process further includes a release additive and a higher percentage of fluoropolymer. The preferred top coat composition comprises approximately 4.1% acrylic polymer emulsion, 12.3% polyurethane polyol, 3.8% polypropylene glycol, 3.9% methylated melamine formaldehyde resin, 53.9% FEP dispersion, and 5.7% of a release additive, such as a polyether modified dimethylpolysiloxane copolymer. The composition has a ratio of acrylic polymer to diol of about 85:15 and a ratio of acrylic polymer and polyol to fluoropolymer of about 30:70.

The three-coat system described above is cured at about 550° F. for about 10 minutes. It is desirable to cure the system at a sufficient temperature, and for a sufficient time, to melt the fluoropolymer into a continuous network.

Any of the coatings described herein can be made to be conductive. In high-speed copiers it is very easy for a large static charge to build up in the paper and to compromise image quality. For this reason, it may be desirable to have a conductive coating that dissipates the static charge. The coatings discussed above may be made conductive by the addition of an electrically conductive pigment such as KETJEN BLACK, which is commercially available from Akzo-Nobel Coating Inc.

Specific one-coat and two-coat embodiments are provided above, however, the number of coats employed does not limit the scope of the present invention. Non-stick coatings of the present invention may also consist of three or more coats. For example, it may be desirable to use two different primers or it may be desirable to add one or more intermediate coats.

While particular embodiments of the present invention have been illustrated and described above, the present invention should not be limited to such examples and descriptions. It should be apparent that changes and modifications may be incorporated and embodied as part of the present invention within the scope of the following claims.

What is claimed is:

1. A non-stick coating formulation comprising:
   a. an acrylic polymer,
   b. an alcohol selected from the group consisting of a polyurethane polyol, a polyester diol, and mixtures thereof, and
   c. a fluoropolymer; wherein the ratio of acrylic polymer to the alcohol is between about 90:10 and about 10:90 by weight.

2. The non-stick coating formulation of claim 1, wherein the alcohol is a polyester diol.

3. The non-stick coating formulation of claim 1, wherein the alcohol is a polyurethane polyol.

4. A non-stick coating formulation comprising:
   a. an acrylic polymer,
   b. an alcohol selected from the group consisting of a diol, a polyol, and mixtures thereof,
   c. a fluoropolymer, and
   d. a polyether modified dimethylpolysiloxane copolymer wherein the ratio of acrylic polymer to the alcohol is between about 90:10 and about 10:90 by weight.

5. The non-stick coating formulation of claim 4, wherein the ratio of acrylic polymer to the alcohol is about 70:30 by weight.

6. The non-stick coating formulation of claim 4, wherein the ratio of acrylic polymer to the alcohol is about 30:70 by weight.

* * * * *